United States Patent Office 3,092,458
Patented June 4, 1963

3,092,458
PROCESS FOR THE PRODUCTION OF
SULFURYL FLUORIDE
Robert P. Ruh, Ralph A. Davis, and Keith A. Allswede, Midland, Mich., assignors to The Dow Chemical Company, Midland, Mich., a corporation of Delaware
No Drawing. Filed Jan. 9, 1958, Ser. No. 707,845
6 Claims. (Cl. 23—203)

This invention relates to an improved process for the production of sulfuryl fluoride and is more particularly concerned with such a process whereby unexpectedly improved yields of sulfuryl fluoride may be obtained.

In United States Patent 2,772,144, there is described a process for preparing sulfuryl fluoride by passing sulfur dioxide, chlorine and hydrogen fluoride over an activated charcoal catalyst. The preferred reaction temperature is recited as being 400° C., while the reaction temperature range may be from 350 to 450° C. In a duplication of this technique, it was found that the percent conversion of chlorine to sulfuryl fluoride varied between 42 and 60 percent. Additionally, the relatively high temperatures caused substantial corrosion of the reactor.

It has now unexpectedly been found that if the temperature of the reaction mixture is maintained between 200 and 280° C., yields in excess of 80 percent may be obtained, with substantially decreased corrosion of the reactor. The reaction is conducted by passing sulfur dioxide, chlorine and an excess of hydrogen fluoride over an activated charcoal catalyst. The temperature is maintained between about 200 and 280° C., preferably between about 220 and 260° C., and desirably at 230 to 240° C. While the pressure usually employed is slightly above atmospheric, higher pressures up to 100 atmospheres may be employed if desired. The resulting reaction products may be separated by fractional distillation in a conventional manner.

The following example is given to illustrate the process of the present invention but is not to be construed as limiting the invention thereto:

A nickel reactor (2″ x 36″) was packed with 1425 cubic centimeters of 6–10 mesh coconut charcoal (Barnaby Cheny U-9). The reactor was heated by a 2.5″ x 24″ tube furnace controlled by a micromax, and the recorded temperature taken on the reactor wall 8 inches from the exit portion of the furnace. Sulfur dioxide, chlorine and anhydrous hydrogen fluoride were metered into a one gallon nickel vaporizer and mixing tank and then lead to the heated reactor. The exit gases were scrubbed with water, dried and condensed in a Dry Ice-cooled receiver. The components of the reaction mixture were separated by fractional distillation.

In one run, during which the reactor was heated at 255° C., 14.62 moles of $SO_2$, 7.98 moles of chlorine, and 46.8 moles of hydrogen fluoride were passed over the catalyst in three hours. This resulted in a mole ratio of hydrogen fluoride to chlorine of 5.87, a mole ratio of sulfur dioxide to chlorine of 1.83, and a contact time of 5.1 seconds. Upon distillation of the reaction products, 7.01 moles (87.9 percent based on the chlorine charged) of sulfuryl fluoride, 0 percent of sulfuryl chlorofluoride and 6.02 moles of sulfur dioxide were recovered.

The above procedure was repeated with the following results:

| Reactor Temperature | Mole Ratios | | Contact Time, Seconds | Percent $Cl_2$ Conversion |
|---|---|---|---|---|
| | $HF/Cl_2$ | $SO_2/Cl_2$ | | |
| 110 | 8.8 | 1.01 | 8.8 | 28.1 |
| 230 | 4.5 | 1.48 | 5.0 | 83.2 |
| 255 | 4.7 | 1.87 | 8.3 | 88.1 |
| 290 | 3.3 | 1.3 | 4.8 | 68.4 |
| 305 | 2.9 | 1.9 | 4.3 | 65.7 |
| 305 | 5.0 | 1.35 | 11.2 | 70.6 |
| 400 | 3.0 | 1.16 | 3.6 | 49.0 |
| 500 | 3.5 | 1.26 | 3.1 | 23.1 |
| 597 | 3.5 | 1.38 | 2.7 | 29.6 |
| 700 | 3.2 | 1.11 | 2.7 | 9.0 |

While a contact time of 5.1 seconds has been specifically disclosed, it is to be noted other contact times as low as 1 second and as high as 50 seconds are operative depending on the volume of catalyst, the specific temperature, the specific pressure, and the ratio of reactants.

Various modifications may be made in the process of the present invention without departing from the spirit or scope thereof and it is to be understood that we limit ourselves only as defined in the appended claims.

We claim:

1. A process for the preparation of sulfuryl fluoride which comprises contacting sulfur dioxide, chlorine and hydrogen fluoride in the presence of an activated charcoal catalyst and at a temperature of from 200 to 280° C., and, recovering sulfuryl fluoride from the resulting gaseous product.

2. A process for the preparation of sulfuryl fluoride which comprises contacting sulfur dioxide, chlorine and hydrogen fluoride in the presence of an activated charcoal catalyst and at a temperature of from 220 to 260° C., and, recovering sulfuryl fluoride from the resulting gaseous product.

3. A process for the preparation of sulfuryl fluoride which comprises contacting sulfur dioxide, chlorine and hydrogen fluoride in the presence of an activated charcoal catalyst and at a temperature of from 230 to 240° C., and, recovering sulfuryl fluoride from the resulting gaseous product.

4. In a method for the preparation of sulfuryl fluoride from sulfur dioxide, chlorine and anhydrous hydrogen fluoride by passing the mixture over an activated charcoal catalyst, the improvement which comprises contacting the reactants in the presence of a catalyst at a temperature of 200 to 280° C.

5. In a method for the preparation of sulfuryl fluoride from sulfur dioxide, chlorine and anhydrous hydrogen fluoride by passing the mixture over an activated charcoal catalyst, the improvement which comprises contacting the reactants in the presence of a catalyst at a temperature of from 220 to 260° C.

6. In a method for the preparation of sulfuryl fluoride from sulfur dioxide, chlorine and anhydrous hydrogen fluoride by passing the mixture over an activated charcoal catalyst, the improvement which comprises contacting the reactants in the presence of a catalyst at a temperature of from 230 to 240° C.

References Cited in the file of this patent

UNITED STATES PATENTS 2,772,144    Belf _____ Nov. 27, 1956